(12) United States Patent
Perttilä

(10) Patent No.: US 7,493,082 B2
(45) Date of Patent: Feb. 17, 2009

(54) METHODS, APPARATUS AND COMPUTER PROGRAM INSTRUCTIONS FOR ENHANCING SERVICE DISCOVERY AT A MOBILE TERMINAL

(75) Inventor: Marko Perttilä, Pernaja (FI)

(73) Assignee: Nokia Corporation, Espoo (FI)

( * ) Notice: Subject to any disclaimer, the term of this patent is extended or adjusted under 35 U.S.C. 154(b) by 628 days.

(21) Appl. No.: 10/844,194

(22) Filed: May 12, 2004

(65) Prior Publication Data

US 2005/0255839 A1    Nov. 17, 2005

(51) Int. Cl.
    *H04B 7/00*    (2006.01)
(52) U.S. Cl. .................... 455/41.2; 455/41.1; 340/10.1
(58) Field of Classification Search ....... 455/41.1–41.3, 455/412.1, 414.1, 414.3, 456.3, 552.1, 556.1, 455/556.2, 558; 340/10.1, 505, 572.1; 709/227–230
See application file for complete search history.

(56) References Cited

U.S. PATENT DOCUMENTS

| | | | |
|---|---|---|---|
| 6,430,554 | B1 | 8/2002 | Rothschild |
| 6,611,673 | B1* | 8/2003 | Bayley et al. ............... 455/564 |
| 6,651,053 | B1 | 11/2003 | Rothschild |
| 2004/0002305 | A1 | 1/2004 | Byman-Kivivuori et al. |
| 2004/0087273 | A1 | 5/2004 | Perttila et al. |
| 2004/0203636 | A1* | 10/2004 | Chan et al. ............... 455/414.1 |
| 2004/0203944 | A1 | 10/2004 | Huomo et al. |
| 2005/0173509 | A1 | 8/2005 | Miettinen |
| 2005/0193106 | A1* | 9/2005 | Desai et al. ............... 709/223 |

FOREIGN PATENT DOCUMENTS

| | | |
|---|---|---|
| EP | 1 224 043 A2 | 9/2002 |
| WO | WO 99/17230 A1 | 4/1999 |
| WO | WO 01/50224 A2 | 7/2001 |
| WO | WO 01/90936 A2 | 11/2001 |
| WO | WO 01/90937 A2 | 11/2001 |
| WO | WO2004-107230 A1 | 12/2004 |

* cited by examiner

*Primary Examiner*—Alexander Eisen
*Assistant Examiner*—Anthony S Addy
(74) *Attorney, Agent, or Firm*—Alston & Bird LLP

(57) ABSTRACT

The invention provides enhancements to service discovery procedures associated with short-range communication in mobile terminals. In particular, the present invention employs a layered service discovery decision-making process that relies on historical information stored in the mobile terminal and mobile terminal analysis of the information associated with tag to make decisions regarding service discovery. As such, the present invention provides efficient service discovery that limits unnecessary connections to external servers and, thereby accelerates the overall service discovery process.

32 Claims, 5 Drawing Sheets

METHODS, APPARATUS AND COMPUTER PROGRAM INSTRUCTIONS FOR ENHANCING SERVICE DISCOVERY AT A MOBILE TERMINAL

FIELD OF THE INVENTION

The present invention relates to short-range communication in mobile terminals, more specifically, to apparatus, methods and computer program products for enhancing service discovery in connection with the reading of transponder information at a mobile terminal.

BACKGROUND OF THE INVENTION

Short-range wireless communication capability is becoming more prominent in a wide variety of mobile digital devices, such as cellular phones, personal digital assistants, pagers and other mobile devices. Conventional technologies, such as barcode or other 2-dimensional-code technologies are giving ground to newer technologies, such Radio Frequency Identification (RFID), Bluetooth®, infrared or the like. By equipping mobile terminals with requisite short-range communication readers the devices have the ability to communicate via these short-range communication mediums dependent upon the type of reader/transceiver associated with the mobile device. Devices equipped with such readers are capable of receiving information from transponders, also referred to as tags. As more and more portable digital devices become equipped with short-range wireless communication means, such as RFID and the like, the device's ability to access information and services expands.

As noted above, one example of such short-range communication media is RFID, which uses electromagnetic or electrostatic coupling in the radio frequency portion of the electromagnetic spectrum as the means for communication. The RFID readers, which are included in the mobile terminals, include an antenna and a transceiver that transmit and receive signals to and from the antenna. RF signals, which are being transmitted from the transceiver, activate RFID tags when the terminal comes in contact with or comes within a predetermined proximate range of the tags. Once a tag has been activated, it transmits information back to the reader.

Tags are generally classified as being passive or active. Active tags have an internal power source, as opposed to passive tags that have no local power source and are energized by a time-varying electromagnetic RF wave generated by the reader. In the passive tag scenario when the RF field passes through the antenna coil associated with the tag, a voltage is generated across the coil. This voltage is ultimately used to power the tag, and make possible the tag's return transmission of information to the reader, commonly referred to as backscattering.

As more and more mobile terminal devices become equipped with short-range communication readers, more and more tags are becoming prevalent with each tag possibly being of varying type and containing different content. Variance in tag type and the information contained on the tag makes it difficult for any one specific reader to provide the capability to read all the tag types and tag content. In this regard, when a mobile terminal equipped with a short-range communication reader encounters a particular tag, the reader should be capable of readily determining whether the tag is (a) relevant for the mobile terminal, and if so, (b) what information/services are associated with the tag and (c) the process required to reach or access the information/service associated with the tag.

In addition, the widespread use of tags will mean that an unlimited number of service providers will be deploying tags that offer various different services. Services provided by the tags include access to networks, such as websites, Short Message Servicing (SMS), telephone service and the like. These tags will, in many instances, require initiation of the related service, such as a web browser or the like, to access information ancillary to the tag. However, since the tags are provided by numerous entities, the means by which these services are initiated will vary depending upon the type of the related tag.

Currently, there are some proprietary solutions for RF tag service initiation in mobile terminals. In these instances the mobile terminals are equipped with the necessary means to resolve service discovery issues to certain RF tags. However, these solutions tend to provide service discovery and initiation for only a very small percentage of the overall RF tag environment. Additionally, such systems typically require the mobile terminal user to subscribe to a specified service.

Other solutions have been offered whereby the mobile terminal is linked with a central network server. In these applications, the mobile terminal reads the tag, the tag information is sent to the server, which attempts to decipher the tag information and subsequently sends the "interpreted" tag information back to the mobile terminal. These solutions typically require connection establishment between the mobile terminal and the server each time a tag is read, which leads to unnecessary delay times and network loads. Also, these types of dedicated service discovery and initiation sites are typically implemented on a pay-per-use basis, and thus cost is an overriding issue that limits the mobile terminal users acceptance of such solutions Therefore a need exists to develop a method, computer program product and/or mobile terminal device that will interpret and process tag content for performing enhanced service discovery routines. The desired method should be capable of providing service discovery regardless of the type of tag encountered, the information provided by the tag or the format of the information on the tag. As such, the desired method, computer program product and/or mobile terminal should be capable of providing service discovery to any and all tags that are encountered by the mobile device. The desired methods, products and mobile terminals should provide efficient discovery that limits unnecessary connection to external servers.

BRIEF SUMMARY OF THE INVENTION

The present invention provides for methods, computer program products and mobile terminals that provide enhancements to service discovery procedures in mobile terminals. The service discovery in mobile terminals is warranted when a mobile terminal receives a communication from a local content source, such as Radio Frequency Identification (RFID), Infrared (IR), Bluetooth®, bar code or other 2D or 3D symbologies. In particular, the present invention employs a layered service discovery decision-making process that relies on historical information stored in the mobile terminal and mobile terminal analysis of the content associated with the communication to make decisions regarding service discovery. As such, the present invention provides efficient service discovery that limits unnecessary connections to external servers and, thereby accelerates the overall service discovery process.

In one embodiment of the invention, a method for short-range communication service discovery in a mobile terminal is defined. The method includes the step of receiving a short-range communication from a local content source including content related to a service. The short-range communication may include, but is not limited to, a RFID communication, an IR communication, a bar code communication, 2D or 3D symbology communication or the like. Once the communication has been received the method will continue with the steps of accessing mobile terminal memory to determine if the received content corresponds with stored service initiation instructions and activating the service if the mobile terminal determines that the received content has corresponding service initiation instructions. If a determination is made that the received content does not have corresponding service initiation instructions, the method will additionally include the step of analyzing the content of the communication to determine if an association exists between the content and stored service information.

The method may additionally include the steps of contacting a service source if a determination is made that an association exists between the content and stored service information and/or activating the service once the mobile terminal has contacted the service source based on service initiation instructions obtained from the service source. The method may also include the steps of sending an information request to one or more content provider sources to determine the service source, if a determination is made that an association does not exist between the content and stored service information, receiving from the content provider sources information related to the service source, contacting the service source upon receipt of information related to the service source and/or activating the service once the mobile terminal has contacted the service source. The content provider sources may be predetermined or they may be determined based on results of analyzing the content of the communication to determine if an association exists between the content and stored service information. Information requests may be sent to the content source providers in sequential order or the requests may be sent simultaneously.

Additionally, the method may further include the step of accessing stored mobile terminal user profile data prior to activating the service to provide the user with a targeted service. Accessing stored user profile data allows the activated service to be targeted to the specific user.

The method may further include the step of, upon activating the service or determining the initiation instructions, storing the information related to the service, including the initiation instructions in mobile terminal memory. Storage of such information allows the terminal to access the stored instructions once subsequent communications contain the same service.

Additionally, the method may include the step of communicating the stored service information, including the stored service initiation instructions from the mobile terminal to remote mobile terminals. In this regard, the mobile terminal can share service information and instructions with other mobile terminals, which in turn store the information for the purpose of expediting service discovery and initiation. Communication of the service information may be configured by the mobile terminal to occur automatically or the communication may be at the bequest of the terminal user. In addition to communicating service information amongst mobile terminals, the mobile terminal may receive service information from service sources or other network entities.

The invention is also embodied in a mobile terminal device capable of short-range communication. The mobile terminal will include a short-range transceiver that is capable of receiving short-range communications from a local content source including content relating to a service and a processor that receives the short-range communication from the transceiver.

The terminal will also include service discovery logic that is in communication with the processor and is capable of determining service initiation instructions related to the service. The service discovery logic will include recognition logic for determining if the received content corresponds with mobile terminal-stored service initiation instructions, association logic for determining if an association exists between the received content and mobile-terminal stored service information and, if so, utilizing the stored service information to obtain service initiation instructions. The service discovery logic will additionally include output generation logic that activates the service based on service instructions provided by either the recognition logic or the association logic. The association logic is implemented if the recognition logic determines that the service has no stored service initiation instructions. The recognition logic will determine if the received content has mobile-terminal-stored service initiation instructions by analyzing a bit pattern of the short-range communication and comparing the bit pattern to mobile terminal-stored bit patterns.

The service discovery logic of the mobile terminal may additionally include analyzation logic that determines if the short-range communication includes recognizable sequences for further association logic processing.

The mobile terminal may additionally include a memory module that stores service information associated with short-range communications that have been processed by the service discovery logic. Storage of the service information allows the mobile terminal to recognize this information in subsequent short-range communications so that activation of the service can occur efficiently. The service discovery logic may further include dedicated update logic that receives information related to short-range communications and stores the information in a related database. In the same fashion that the terminal may learn and store information from received short-range communications, the terminal may also be provided information from an ancillary source and process such information via the dedicated update logic. Examples of such ancillary sources include the mobile terminal user, a dedicated service provider and another mobile terminal. The dedicated update logic provides another means for the mobile terminal to acquire and store information related to short-range communications so that subsequent service activation can occur efficiently.

Additionally, the invention is embodied in a computer program product, executed in a mobile terminal, for providing short-range communication service discovery. The application includes a computer readable storage medium having computer-readable program instructions embodied in the medium. The computer-readable program instructions includes first instructions for determining if a service related to a short-range communication has service initiation instructions stored in mobile terminal memory and second instructions for determining, if a determination is made that the service does not have stored service initiation instructions, if an association exists between the content of the short-range communication and stored service information. The second instructions may further provide for contacting a service source if a determination is made that an association exists between the content and stored service information.

The computer-readable program instructions may additionally include third instructions for activating the service once the determination is made that the service has stored service initiation instructions or if a determination is made that an association exists between the content and stored service information. The computer-readable program instructions may additionally include fourth instructions for sending an information request to one or more content provider sources to determine the service source, if a determination is made that an association does not exist between the content and stored service initiation instructions.

The invention may also be embodied in a system for short-range communication enhancement of service discovery. The system includes a local content source capable of transmitting content related to a service and a mobile terminal capable of receiving the content transmitting from the local content source, a processor in communication with the transceiver that reads the information and service discovery logic capable of determining service initiation for the service. The service discovery logic includes recognition logic for determining if the service has mobile terminal-stored service initiation instructions, association logic for determining if the transponder information is associated with stored service information and output generation logic that activates the service.

Thus, the present invention provides a multi-domain approach to short-range communication service discovery in mobile terminals. The first domain provides the mobile device with analysis of historical data to determine if the service associated with the short-range communication has been previously discovered, activated and stored in terminal memory. The second domain provides the mobile terminal with analysis of the short-range communication to determine sequences within the communication and association of the sequences with stored service information. The third domain provided for the mobile terminal to contact predetermined service sources if the service is not known by the terminal and the association process is unsuccessful. As such, the present invention provides efficient service discovery that limits unnecessary connections to external servers and, thereby accelerates the overall service discovery process.

BRIEF DESCRIPTION OF THE DRAWINGS

Figure 1:
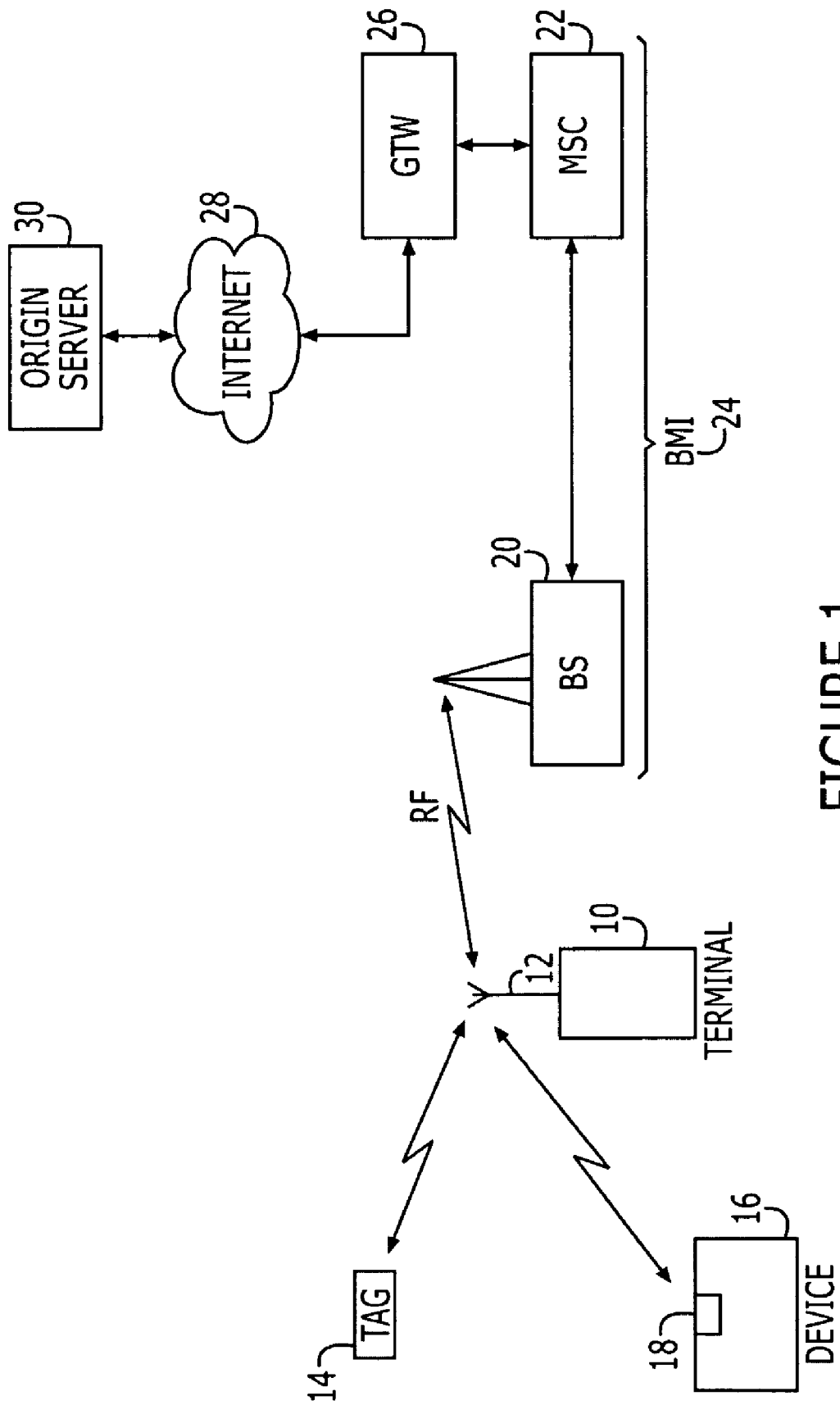

Having thus described the invention in general terms, reference will now be made to the accompanying drawings, which are not necessarily drawn to scale, and wherein:

FIG. 1 is a block diagram of a mobile terminal incorporating short-range communication and cellular network communication capabilities, in accordance with an embodiment of the present invention.

Figure 2:
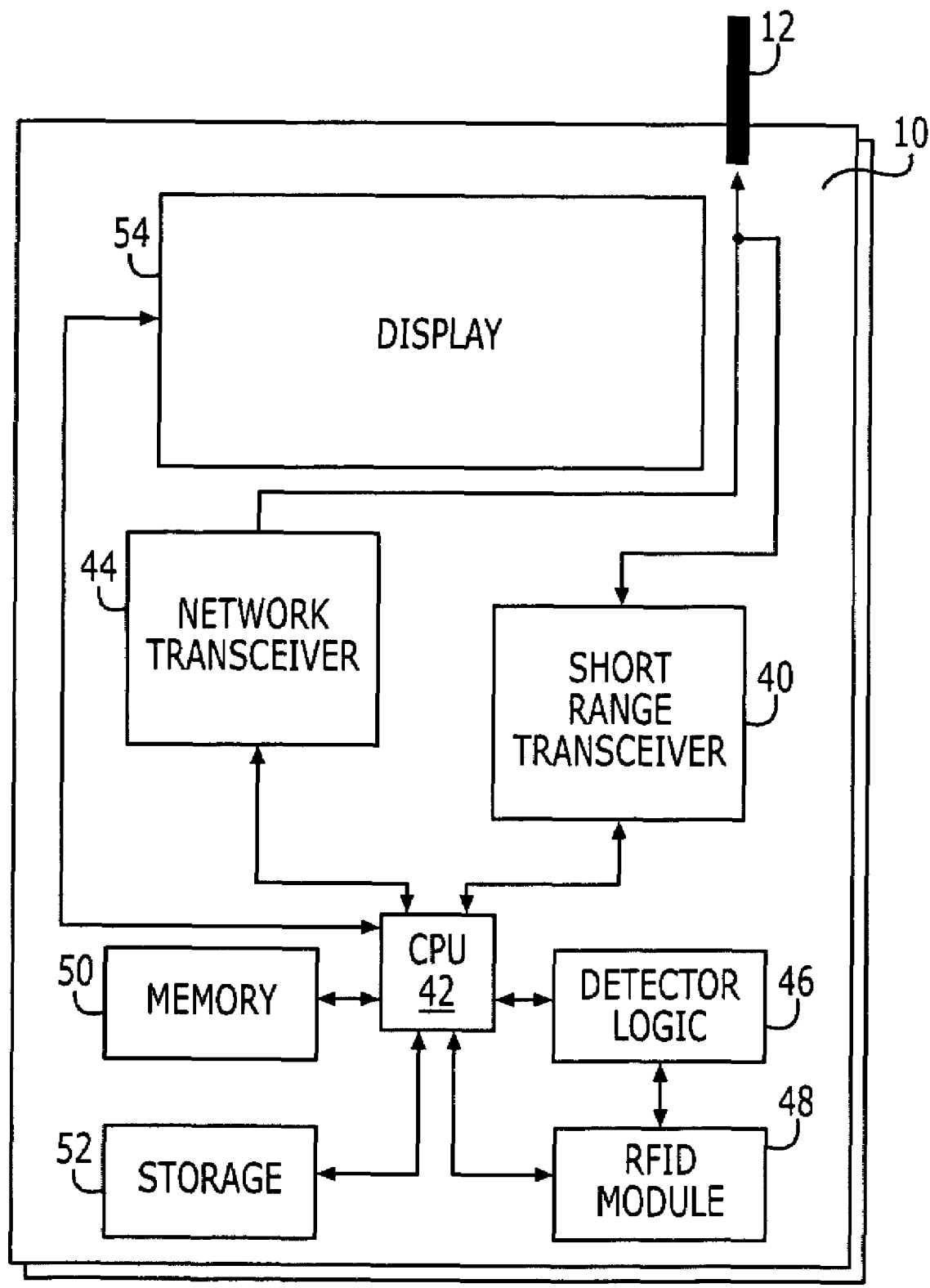

FIG. 2 is a block diagram of a mobile terminal that implements service discovery logic, in accordance with an embodiment of the present invention.

Figure 3:
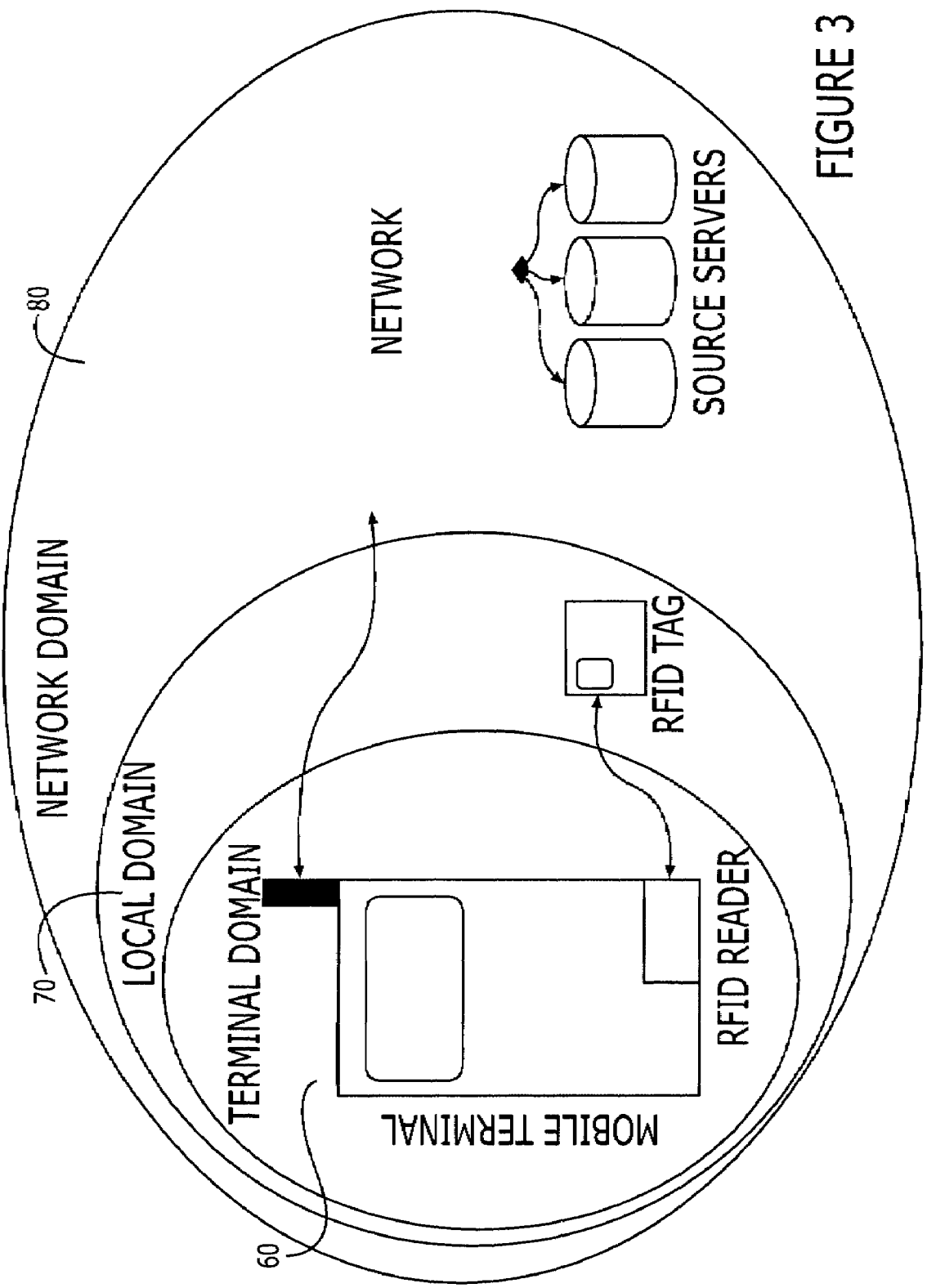

FIG. 3 is a domain diagram of the multiple domains in the service discovery routine implemented by mobile terminals, in accordance with an embodiment of the present invention.

Figure 4:
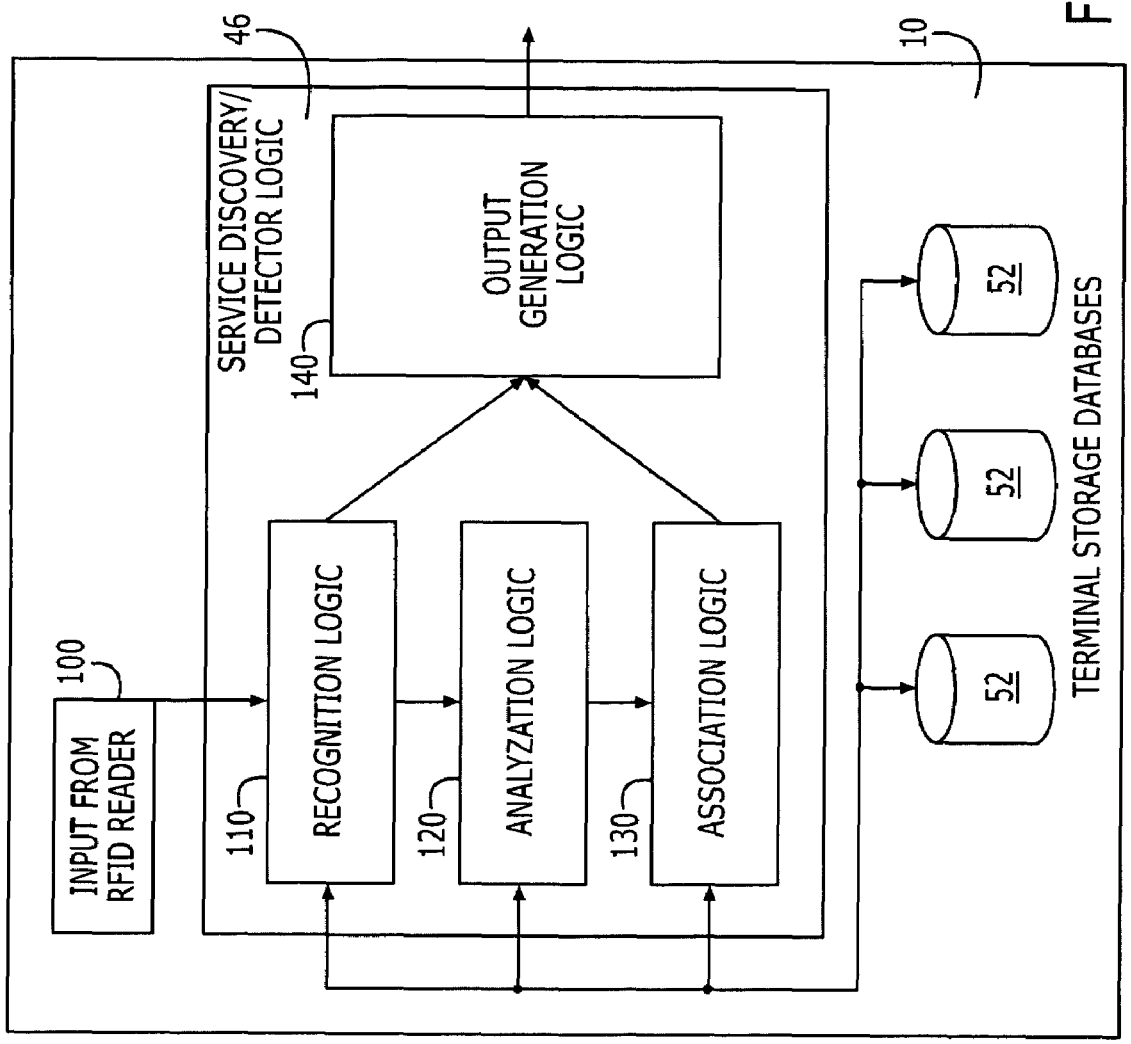

FIG. 4 is a block diagram of the service discovery logic implemented by a mobile terminal, in accordance with an embodiment of the present invention.

Figure 5:
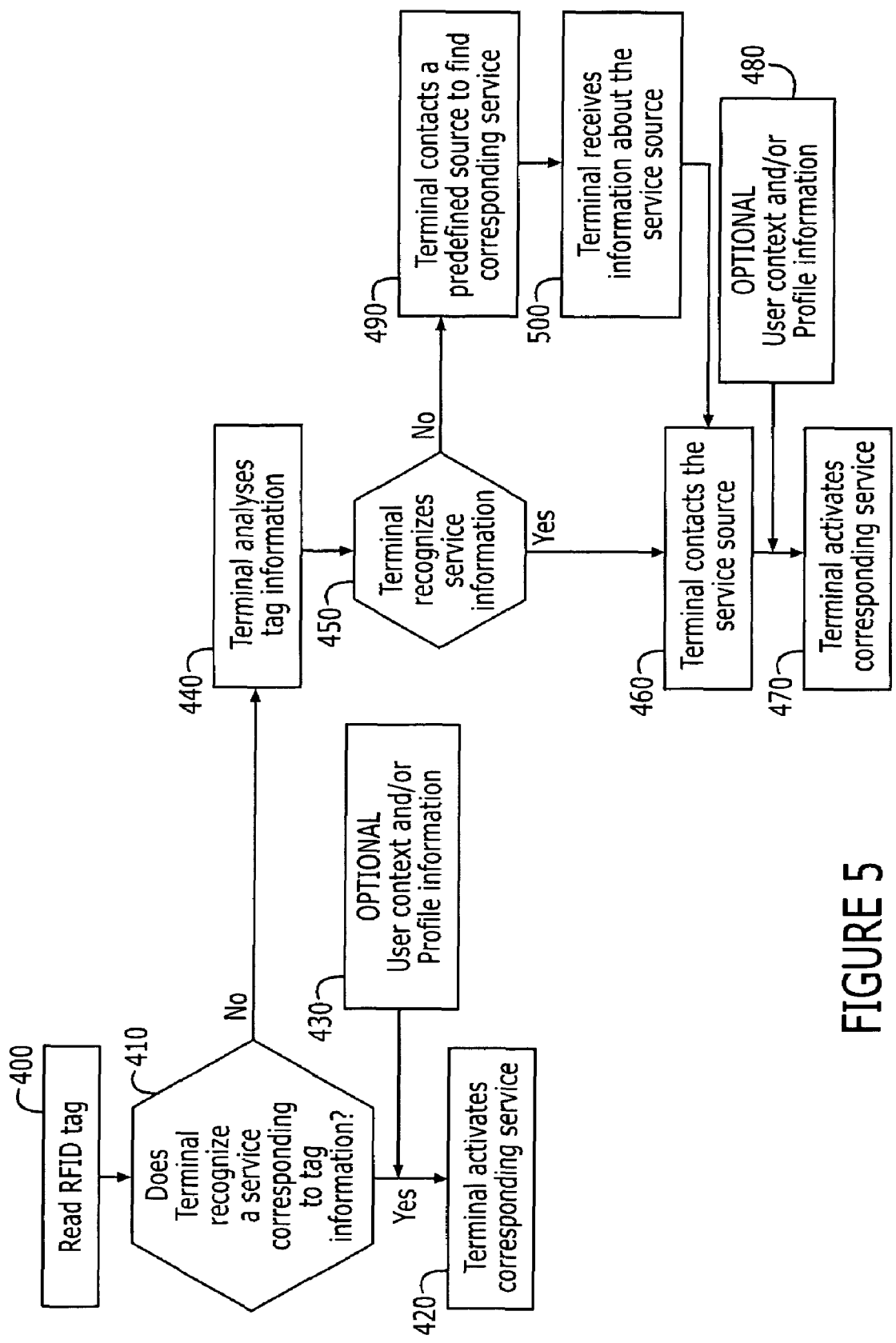

FIG. 5 is a flow diagram of service discovery and activation in a mobile terminal, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for methods, apparatus and computer program products for short-range communication service discovery and service initiation in a mobile terminal. Mobile terminals that have short-range communication capability, such as, for example, being equipped with an RFID reader, will be capable of receiving transponder communication from numerous transponders, i.e., tags. In addition to RFID short-range communication, mobile terminals may be equipped with Bluetooth® transceivers, infrared readers, bar code readers or other types of 2D or 3D symbology readers. Many of these communications will relate to initiation and activation of a service to benefit from the information included within the communication. These services may include, but are not limited to, accessing Internet web sites, sending Short Messaging Service (SMS) messages, initiating telephone calls and the like. The present invention provides for an efficient and effective method for service discovery and service initiation in a mobile terminal, such as a mobile telephone, personal digital assistant (PDA) or the like.

Referring to FIG. 1, an illustration is provided of a communication network 100 that implements a mobile terminal having short-range communication capabilities. Such a mobile terminal will generally benefit from the embodiment of the present invention. As disclosed, the system, terminal and method embodiments of the present invention will be primarily described in conjunction with mobile communications applications. It should be understood, however, that the systems, terminals and methods of the present invention may be utilized in conjunction with a variety of other applications, both in the mobile communication environment and outside of the mobile communication environment.

Referring to FIG. 1, the mobile terminal 10 is equipped with wireless short-range communication capabilities. As such, the terminal will include an antenna 12, as part of a short-range communication transceiver, for transmitting signals to and receiving signals from proximate transponder 14 and electronic device 16 equipped with internal short-range communication transceiver 18. As will be appreciated, the electronic devices and transponders can comprise any of a number of different known devices and transponders capable of transmitting and/or receiving data in accordance with any of a number of different short-range communication techniques. For example, the short-range communication technique may include RFID, Bluetooth®, infrared, IrDA (Infrared Data Association), bar code, 2D or 3D symbology or the like. The electronic device 16 may include any of a number of different devices, including other mobile terminals, and wireless accessories, portable digital assistants (PDAs), pagers, laptop computers and other types of electronic systems. Likewise, for example, the transponders can comprise Radio Frequency Identification (RFID) tags, bar codes or the like.

The mobile terminal 10 may additionally include the capability to communicate via a cellular network. In the present invention, the cellular network may be relied upon to initiate and access services that are included in the short-range communication. For example, the cellular network may be relied upon to access Internet web sites, send or receive SMS messages, place or receive telephone calls or the like. In those embodiments, the mobile terminal antenna 12 will transmit signals to and receive signals from a base site or base station (BS) 20. The base station is a part of a cellular network that includes elements required to operate the network, such as a mobile switching center (MSC) 22. As is known by those of ordinary skill in the art of telecommunications, the cellular network may also be referred to as a Base Station, Mobile Switching Center and Interworking function (BMI) 24. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 26 (Gateway).

The MSC 22 can be coupled to a network, such as a local area network (LAN), a metropolitan area network (MAN), and/or a wide area network (WAN). The MSC can be coupled to the network directly, or if the system includes a GTW 26 (as shown), the MSC can be coupled to the network via the GTW. In one typical embodiment, for example, the MSC is coupled to the GTW, and the GTW is coupled to a WAN, such as the Internet 28. In turn, devices such as processing elements (e.g., personal computers, server computers or the like) can be coupled to the terminal 10 via the Internet. For example, the processing elements can include one or more processing elements associated with an origin server 30.

FIG. 2 provides a block diagram of a mobile terminal implementing short-range communication service discovery and initiation, in accordance with an embodiment of the present invention. The mobile terminal 10 will include an antenna 12 and a short-range transceiver 40 that work in unison to transmit and receive short-range communications. The transceiver is in communication with the mobile terminal's central processing unit (CPU) 42, such that received communications are communicated from the transceiver to the processor and communications to be transmitted are communicated form the processing device to the transceiver. Additionally, the mobile terminal may include a network transceiver, such as cellular network transceiver 44. The network transceiver is in communication with the antenna and the central processing unit and serves to transmit and receive network communications, such as cellular network communications.

The mobile terminal will additionally include service discovery logic 46 that discovers the service associated with a received short-range communication and initiates the discovered service. The service discovery logic is in communication with CPU 42 and the short-range communication module 48 that is responsible for reading and displaying the contents of the short-range communication. In certain embodiments of the invention the service discovery logic, the CPU and the short-range communication module may be physically embodied in one unit, such as a multi-purpose microprocessor.

The terminal will additionally include memory 50 and storage units 52 that are in communication with the processor 42. The memory unit 50 is typically read-only memory (ROM) that is relied upon for the operation of the processor. The storage unit is dedicated memory that is relied upon by the service discovery logic 46. As such, the storage unit stores previously read bit patterns and information related to service association. The service discovery logic will access the storage unit, via the CPU, to determine if the contents of the tag obtained via short-range communication are associated with a known service or to determine if a portion of the contents of the tag is recognizable. The mobile terminal will also typically include a display 54 that is in communication with the CPU and is responsible for displaying short-range communication content and services associated with the content.

The service discovery logic of the present invention may be illustrated by multiple layered domains; each domain characteristic of a process for discovering and initiating service associated with a short-range communication. FIG. 3 provides an overview of the multiple domains in the service discovery routine. At the terminal domain 60 the method relies on terminal storage to recognize the service corresponding to the communication. If the terminal memory includes the service and the corresponding service initiation instructions then service is initiated. If the terminal domain is unable to recognize the service, then the local domain 70 is implemented to determine if the content of the communication can be used to discover the service. In the local domain the content of the tag is analyzed to determine recognizable sequences and the sequences are associated to determine if service discovery is possible. If the local domain is unable to determine the service and the initiation instructions, then the network domain 80 is implemented to determine service and initiation instructions by contacting one or more predefined content service providers. At the network domain the mobile terminal will use information determined at the local domain, such as the type of service, to select the content service providers. For example, if analyzation of the content, at the local domain, determines that the service is a web-service but is unable to specifically discover the service (i.e., pinpoint the exact web-service to be accessed) then, the network domain will use this information to contact predefined web-service content service providers.

FIG. 4 provides a block diagram of the service discovery logic 46 that is executed in a mobile terminal 10, in accordance with an embodiment of the present invention. The service discovery logic may be implemented in a stand-alone logic device (not depicted in FIG. 4) or it may be implemented in another multi-functional device, such as a processor device (not depicted in FIG. 4). The service discovery logic will receive inputs in the form of short-range communications from a short-range transceiver, such as RFID reader 100. It should be noted that while the FIG. 4 embodiment illustrates an RFID reader, other readers, such as a barcode reader, an infrared reader, a Bluetooth® reader or the like are also possible and within the inventive concepts herein disclosed. The service discovery logic will include recognition logic 110, analyzation logic 120, association logic 130 and output generation logic 140.

The recognition logic 110 is responsible for determining if the bit pattern in the short-range communication is recognizable. Recognition of the bit pattern is determined by comparing the bit pattern to bit patterns stored in associated mobile terminal storage databases 300. The storage databases will store previously read bit patterns and the corresponding instructions necessary to initiate services associated with the bit pattern. If the bit pattern is "recognized" the recognition logic has effected service discovery and then communicates with the output generation logic 140 to initiate necessary procedures for corresponding service initiation. In this regard, once the recognition logic has determined that the bit pattern is recognizable, i.e., the service is "discovered", the output generation logic is responsible for service initiation, i.e., retrieving the web page, sending the SMS message, making the telephone call or the like. The functions of the recognition logic are considered to be executed in the terminal domain.

The analyzation logic 120, which is only performed if the recognition logic does not find a match, performs a more thorough analyzation of the contents of the tag obtained via short-range communication to determine similarities between contents of the communication and information stored in terminal storage. This further analyzation attempts to find one or more recognizable sequences within the bit pattern that may provide insight into the service(s) associated with the short-range communication. Thus, analyzation logic will parse the bit pattern into sequences and compare the sequences with recognizable sequences stored in associate mobile terminal storage databases 52.

If one or more recognizable sequences are determined the analyzation logic 120 will communicate with the association logic 130. The association logic will parse the results of the analyzation logic and make decisions for discovering the service based on the results of the analyzation logic. In addition, the association logic will communicate with the storage databases 300 to determine if an association exists in storage for the recognizable sequences. If the recognition logic is unable to recognize the bit pattern but the analyzation logic determines one or more recognizable sequences, such as the service type and the service ID, then the association logic may be capable of discovering the service and the service initiation instructions by activating the necessary components of the service type and contacting the service ID. For example, if the analyzation logic determines recognizable sequences for service type, i.e., web-service and for service ID, i.e., Acme Company, then the association logic may provide the output generation logic with instructions for activating a web browser and contacting Acme Company's web-site.

If the association logic is unable to provide the output generation logic with instructions for discovering the service in the communication, then the mobile terminal may contact a dedicated service provider for determining the service in the short-range communication and the instructions for initiating the service. Typically, dedicated service providers will be contacted in predetermined sequential order until one of the service providers is able to discover the service associated with the tag. Contacting of dedicated service providers is performed at the network domain. The network domain may use information acquired at the local domain, such as service type or service ID, to determine which dedicated service providers are to be contacted or the sequential order for contacting the dedicated service providers. If the local domain is unable to render such information, the network domain will rely on a predefined sequential order for contacting dedicated service providers.

Once the service discovery logic 100 has discovered the service and the initiation instruction for the service, the logic is capable of caching or storing the service and corresponding initiation instructions in the mobile terminal storage database 52 for subsequent recognition by the recognition logic 110.

FIG. 5 provides a flow diagram of the method for service discovery and service initiation in a mobile terminal, in accordance with an embodiment of the present invention. The process is initiated at step 400, at which the reader of the mobile terminal reads the contents of a tag obtained via short-range communication. At step 410, a determination is made as to whether the terminal recognizes a service and initiation instructions corresponding to the contents of the tag. This determination is accomplished by the recognition logic, which determines the bit pattern of the communication and compares the bit pattern to those stored in terminal storage to determine if a match exists. If a determination is made that the service is known and initiation instructions exist, then at step 420, the terminal will activate the corresponding service. Service activation is accomplished by the output generation logic portion of the service discovery logic. In certain embodiments, upon determining that the service is known, the terminal will, at optional step 430, communicate with terminal storage to determine user context and/or user profile information prior to activation of the service. The additional user context or profile information allows the service to be more targeted to the user of the mobile terminal.

If the recognition logic is unable to recognize the service, i.e., the bit pattern of the communication is not stored in terminal memory then, at step 440 further analysis of the content of the communication is performed. Further analysis of the content of the communication will be executed by the analyzation logic, which provides for parsing the overall bit pattern into recognizable sequences. Once the analyzation logic has determined recognizable sequences, at step 450, an association process is executed by the association logic to determine if the recognizable sequences can be associated with service information, such as a service type or a service provider. If the recognizable sequences are successfully associated with service information, based on a comparison of the sequences to stored information, then at step 460, the mobile terminal will contact the service source. The terminal will provide the content of the communication to the service source and the service source will respond to the terminal with the service that corresponds to the content of the communication.

Once the terminal has contacted the service source, at step 470, the terminal will activate the corresponding service. Service activation is accomplished by the output generation logic portion of the service discovery logic. In certain embodiments, upon contacting the service source, the terminal will, at optional step 480, communicate with terminal storage to determine user context and/or user profile information prior to activation of the service. The additional user context or profile information allows the service to be more targeted to the user of the mobile terminal.

If the association process is unable to associate the recognizable sequences with service information then, at step 490, the mobile terminal will communicate with one or more predefined dedicated service providers to determine the corresponding service. At step 500, the mobile terminal will receive information from the contacted service provider that will allow the mobile terminal, at step 460, to contact the service source. Once the terminal has contacted the service source, at step 470, the terminal will activate the corresponding service. In certain embodiments, upon contacting the service source, the terminal will, at optional step 480, communicate with terminal storage to determine user context and/or user profile information prior to activation of the service.

Additionally, the methods, devices and systems of the present invention may provide for communicating stored service information, including the stored service initiation instructions from the mobile terminal to remote mobile terminals. In this regard, once a mobile terminal discovers a service and the proper initiation instructions the terminal can share such information with other mobile terminals, which in turn store the information for the purpose of expediting service discovery and initiation. Such sharing of service discovery and initiation instructions provides for a higher probability that service discovery will be limited to the terminal domain (as described infra.), thereby limiting the contacting of service sources to determine service and service initiation. Communication of the service information may be configured by the mobile terminal to occur automatically or the communication may be at the bequest of the discovering mobile terminal user or at the bequest of the remote terminal user. In addition to communicating service information amongst mobile terminals, the mobile terminal may receive, typically be some form of wireless communication, service information from service sources or other network entities.

Thus, the present invention provides for methods, computer program products and mobile terminals that provide enhancements to service discovery procedures associated with short-range communication transponders (i.e., tags). In particular, the present invention employs a layered service discovery decision-making process that relies on historical information stored in the mobile terminal and mobile terminal analysis of the information associated with tag to make decisions regarding service discovery. As such, the present invention provides efficient service discovery that limits unnecessary connections to external servers and, thereby accelerates the overall service discovery process.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
receiving a short-range communication including content relating to a service;
accessing local memory to determine if the received content corresponds with stored service initiation instructions, wherein determining if the received content corresponds with stored service initiation instructions comprises analyzing a bit pattern of the short-range communication and comparing the bit pattern to one or more locally stored bit patterns;
activating the service if it is determined that the received content has corresponding service initiation instructions; and
when a determination is made that the received content does not have corresponding service initiation instructions, analyzing the received content to determine if an association exists between the received content and stored service information, and utilizing the stored service information to obtain service initiation instructions from a remote service source determined based upon the association between the received content and stored service information when an association exists between the received content and stored service information 2. The method of claim 1, further comprising activating the service based on service initiation instructions obtained from the remote service source.

3. The method of claim 2, further comprising accessing stored user profile data prior to activating the service to provide the user with a targeted service.

4. The method of claim 1, further comprising sending an information request to one or more content provider sources to determine the service source, if a determination is made that an association does not exist between the received content and stored service information.

5. The method of claim 4, further comprising receiving from the one or more content provider sources information related to the service source.

6. The method of claim 5, further comprising contacting the service source upon receipt of information related to the service source.

7. The method of claim 6, further comprising: receiving service initiation instructions from the service source; and activating the service based upon the received service initiation instructions.

8. The method of claim 4, wherein sending an information request to one or more content provider sources to determine the service source further comprises determining the one or more content provider sources based on results of analyzing the received content of the communication to determine if an association exists between the received content and stored service information.

9. The method of claim 4, wherein sending an information request to one or more content provider sources further comprises sending an information request to a first predefined content provider source.

10. The method of claim 9, wherein sending an information request to a first predefined content provider source further comprises sending an information request to a second predefined content provider source if the first content source is unsuccessful in determining service initiation instructions.

11. The method of claim 1, further comprising accessing stored user profile data prior to activating the service to provide the user with a targeted service.

12. The method of claim 1, wherein receiving a short-range communication including content relating to a service further comprises receiving a short-range communication chosen from the group consisting of Radio Frequency Identification (REID), Infrared (IR), bar code, two-dimensional symbology and three-dimensional symbology.

13. The method of claim 1, further comprising upon activation of the service, storing, in local memory, information related to the service and the service initiation instructions.

14. The method of claim 1, further comprising communicating stored service information stored in local memory to one or more remote devices.

15. The method of claim 14, wherein communicating stored service information is further defined as being performed automatically.

16. The method of claim 14, wherein communicating stored service information is further defined as being performed at the bequest of a local user.

17. The method of claim 1, further comprising:
receiving service information from a service source; and
storing the received service information in local memory.

18. An apparatus comprising:
service discovery logic that, based upon a received short range communication including content relating to a service, is configured to determine service initiation instructions related to the service, wherein the service discovery logic includes:
recognition logic configured to determine if received content corresponds with locally stored service initiation instructions by analyzing a bit pattern of the short-range communication and comparing the bit pattern to one or more locally store bit patterns,
association logic configured to determine if an association exists between the received content and locally stored service information, and utilize the locally stored service information to obtain service initiation instructions from a remote service source determined based upon the association between the received content and the locally stored service information when an association exists between the received content and the locally stored service information, wherein the association logic is implemented in response to the recognition logic determining that the received content has no stored service initiation instructions, and
output generation logic configured to activate the service based on the locally stored service initiation instructions or the obtained service initiation instructions.

19. The apparatus of claim 18, wherein the service discovery logic further comprises analyzation logic configured to determine if the short-range communication has recognizable sequences for further association logic processing.

20. The apparatus of claim 18, further comprises a memory module configured to store service information associated with short-range communication that have been processed by the service discovery logic.

21. The apparatus of claim 18, wherein the service discovery logic further comprises dedicated update logic configured to receive communications that include information related to services and store the information in a related database.

22. The apparatus of claim 21, wherein the dedicated update logic is further configured to receive communications that include information related to services from a member of the group consisting of a local device user, a dedicated service provider and a remote computing device.

23. The apparatus of claim 18, further comprising a user profile database that is accessed prior to activating the service to customize the service based upon the user profile.

24. A computer program product comprising a computer readable storage medium having computer-readable program instructions embodied in the medium and executable by a computing device, the computer-readable program instructions comprising:
  first instructions for receiving a short-range communication including content relating to a service;
  second instructions for accessing local memory to determine if the received content corresponds with stored service initiation instructions, wherein determining if the received content corresponds with stored service initiation instructions comprises analyzing a bit pattern of the short-range communication and comparing the bit pattern to one or more locally stored bit patterns;
  third instructions for activating the service if it is determined that the received content has corresponding service initiation instructions;
  fourth instructions for determining, when a determination is made that the service does not have stored service initiation instructions, if an association exists between the content of the short-range communication and stored service information; and
  fifth instructions for utilizing the stored service information to obtain service initiation instructions from a remote service source determined based upon the association between the received content and stored service information.

25. The computer program product of claim 24, further comprising sixth instructions further provide for activating the service if a determination is made that an association exists between the received content and stored service information.

26. The computer program product of claim 24 further comprising sixth instructions for sending an information request to one or more content provider sources to determine the service source, if a determination is made that an association does not exist between the content and stored service information.

27. A system comprising:
  a local content source configured to transmit content related to a service; and
  a device configured to receive the content transmitted from the local content source and including a processor configured to implement service discovery logic configured to determine service initiation for the service, the service discovery logic including:
  recognition logic configured to determine if received content corresponds with locally stored service initiation instructions by analyzing a bit pattern of the short-range communication and comparing the bit pattern to one or more locally stored bit patterns,
  association logic configured to determine if an association exists between the received content and locally stored service information, and utilize the locally stored service information to obtain service initiation instructions from a remote service source determined based upon the association between the received content and the locally stored service information when an association exists between the received content and the locally stored service information, wherein the association logic is implemented in response to the recognition logic determining that the received content has no stored service initiation instructions, and
  output generation logic configured to activate the service based on the locally stored service initiation instructions or the obtained service initiation instructions.

28. The system of claim 27, wherein the service discovery logic further comprises analyzation logic configured to determine if the short-range communication has recognizable sequences for further association logic processing.

29. The system of claim 27, wherein the device further includes a memory module configured to store service information associated with short-range communications that have been processed by the service discovery logic.

30. The system of claim 27, wherein the service discovery logic further comprises dedicated update logic configured to receive communications that include information related to services and store the information in a related database.

31. The system of claim 30, wherein the dedicated update logic is further configured to receive communications that include information related to services from a member of the group consisting of the device user, a dedicated service provider and a remote computing device.

32. The system of claim 27, wherein the device further includes a user profile database that is accessed prior to activating the service to customize the service based on user profile information stored in the user profile database.

* * * * *

UNITED STATES PATENT AND TRADEMARK OFFICE
CERTIFICATE OF CORRECTION

PATENT NO. : 7,493,082 B2
APPLICATION NO. : 10/844194
DATED : February 17, 2009
INVENTOR(S) : Perttilä

Page 1 of 1

It is certified that error appears in the above-identified patent and that said Letters Patent is hereby corrected as shown below:

<u>Column 12,</u>
Line 20, "(REID)" should read --(RFID)--;
Line 47, "store" should read --stored--.

<u>Column 14,</u>
Line 2, after "the" insert --received--;
Line 12, after "if" insert --the--.

Signed and Sealed this

Fifth Day of May, 2009

JOHN DOLL
*Acting Director of the United States Patent and Trademark Office*